(12) United States Patent
Romer

(10) Patent No.: US 12,038,065 B2
(45) Date of Patent: Jul. 16, 2024

(54) MAGNETORHEOLOGICAL DAMPENER SYSTEM FOR PROTECTING WELL EQUIPMENT

(71) Applicant: ExxonMobil Technology and Engineering Company, Spring, TX (US)

(72) Inventor: Michael C. Romer, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 1024 days.

(21) Appl. No.: 16/939,205

(22) Filed: Jul. 27, 2020

(65) Prior Publication Data

US 2021/0102597 A1    Apr. 8, 2021

Related U.S. Application Data

(60) Provisional application No. 62/912,470, filed on Oct. 8, 2019.

(51) Int. Cl.
| | |
|---|---|
| *F16F 9/53* | (2006.01) |
| *E21B 43/12* | (2006.01) |
| *F16F 9/10* | (2006.01) |
| *F16F 9/32* | (2006.01) |
| *F16F 15/00* | (2006.01) |

(52) U.S. Cl.
CPC .......... *F16F 9/535* (2013.01); *E21B 43/121* (2013.01); *E21B 43/123* (2013.01); *F16F 9/106* (2013.01); *F16F 9/3292* (2013.01); *F16F 15/005* (2013.01); *F16F 2222/06* (2013.01); *F16F 2224/045* (2013.01); *F16F 2228/066* (2013.01); *F16F 2230/18* (2013.01)

(58) Field of Classification Search
CPC ......... F16F 9/535; F16F 9/532; E21B 43/123; E21B 43/121
See application file for complete search history.

(56) References Cited

U.S. PATENT DOCUMENTS

| | | | |
|---|---|---|---|
| 2012/0205122 A1* | 8/2012 | Peter ................... | E21B 34/085 166/321 |
| 2015/0369326 A1* | 12/2015 | Modrezejewski ...... | F16F 9/006 188/267.1 |
| 2017/0356277 A1* | 12/2017 | Kleppa .................. | F16J 3/06 |
| 2021/0010348 A1 | 1/2021 | Romer et al. | |

* cited by examiner

*Primary Examiner* — Lam S Nguyen
(74) *Attorney, Agent, or Firm* — ExxonMobil Technology and Engineering Company—Law Department

(57) ABSTRACT

Systems and a method for resisting a fluctuation in a value of a parameter relating to well equipment using a magnetorheological dampener system are described herein. The method includes continuously determining the value of the parameter relating to the well equipment, determining a fluctuation in the value of the parameter, and comparing the fluctuation in the value of the parameter to a preset limit. The method also includes energizing an electromagnet to increase a viscosity of a magnetorheological fluid (MRF) if the fluctuation exceeds the preset limit.

25 Claims, 10 Drawing Sheets

100

102

500

MAGNETORHEOLOGICAL DAMPENER SYSTEM FOR PROTECTING WELL EQUIPMENT

CROSS-REFERENCE TO RELATED APPLICATION

This application claims the benefit of U.S. Provisional Application 62/912,470 filed Oct. 8, 2019 entitled MAGNETORHEOLOGICAL DAMPENER SYSTEM FOR PROTECTING WELL EQUIPMENT, the entirety of which is incorporated by reference to herein.

FIELD

The techniques described herein relate to a magnetorheological dampener system for protecting well equipment. More particularly, the techniques described herein relate to resisting fluctuations in the value of a parameter relating to well equipment using a magnetorheological dampener system.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

The production of oil and gas is not always a steady, consistent process. Producing reservoirs can cycle and surge for various reasons, such as inconsistent drawdowns, fluid mixtures, and surface processing effects. These cycles result in varying pressures, temperatures, flow rates, and mixture densities throughout the production systems, such as downhole in the production tubulars, in the wellhead at the surface, and throughout the surface producing facilities. Production systems are generally designed to handle these transient conditions, but severe inconsistent behavior can still stress and/or damage the production systems.

SUMMARY

An exemplary embodiment provides a magnetorheological dampener disposed within well equipment. The magnetorheological dampener includes a storage chamber containing a magnetorheological fluid (MRF), an exhaust chamber, and an orifice that fluidically couples the storage chamber to the exhaust chamber. The magnetorheological dampener also includes an electromagnet disposed proximate to the storage chamber and the exhaust chamber. The electromagnet is configured to increase a viscosity of the MRF to resist a fluctuation in a value of a parameter within the well equipment, and the MRF flows through the orifice and into the exhaust chamber in response to an amount of force that is determined by the viscosity of the MRF.

Another exemplary embodiment provides a method for resisting a fluctuation in a value of a parameter relating to well equipment using a magnetorheological dampener system. The method includes continuously determining the value of the parameter relating to the well equipment, determining a fluctuation in the value of the parameter, and comparing the to fluctuation in the value of the parameter to a preset limit. The method also includes energizing an electromagnet to increase a viscosity of a magnetorheological fluid (MRF) if the fluctuation exceeds the preset limit.

Another exemplary embodiment provides a magnetorheological dampener system. The magnetorheological dampener system includes a sensor configured to detect a value of a parameter within well equipment and a magnetorheological dampener. The magnetorheological dampener includes a storage chamber containing a magnetorheological fluid (MRF), an exhaust chamber, an orifice that fluidically couples the storage chamber to the exhaust chamber, and an electromagnet disposed proximate to the storage chamber and the exhaust chamber. The magnetorheological dampener system also includes a controller, including a processor configured to implement instructions from a data store. The data store includes instructions to direct the processor to continuously read the value of the parameter, determine a fluctuation in the value of the parameter, compare the fluctuation to a preset limit, and energize the electromagnet to increase a viscosity of the MRF if the fluctuation exceeds the preset limit. The MRF flows through the orifice and into the exhaust chamber in response to an amount of force that is determined by the viscosity of the MRF.

DESCRIPTION OF THE DRAWINGS

The foregoing and other advantages of the present techniques may become apparent upon reviewing the following detailed description and drawings of non-limiting examples in which.

Figure 1A:
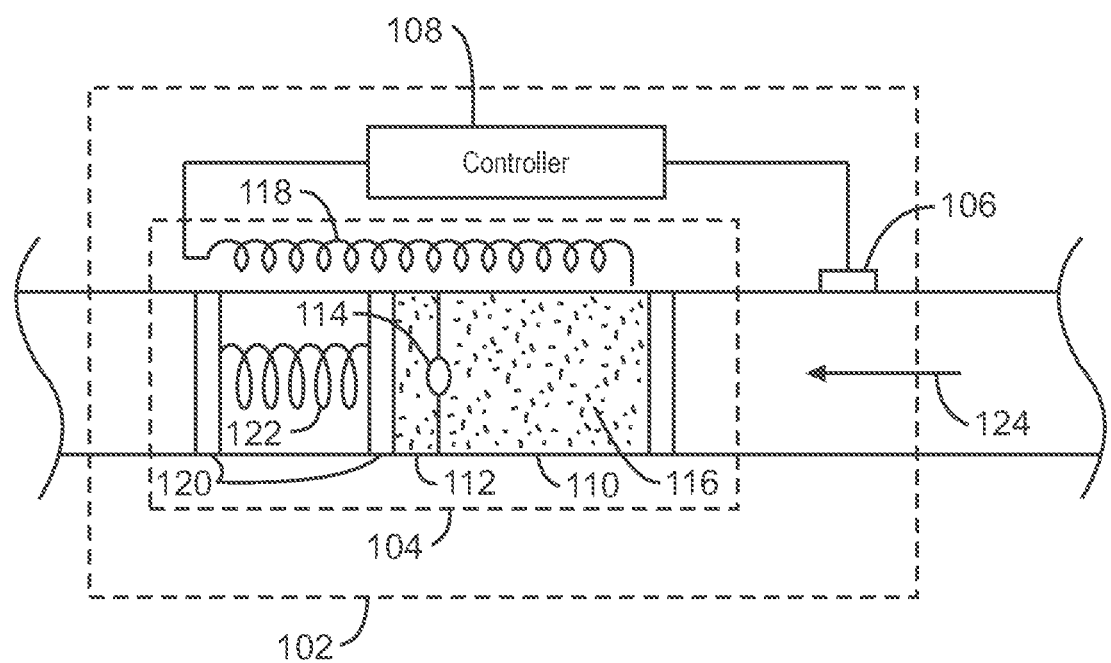
FIG. 1A is a schematic of well equipment including a magnetorheological dampener system in a deactivated state.

It should be noted that the figures are merely examples of the present techniques, and no limitations on the scope of the present techniques are intended thereby. Further, the figures are generally not drawn to scale, but are drafted for purposes of convenience and clarity in illustrating various aspects of the techniques.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a to description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases, liquids, and combinations of gases and liquids, as well as to combinations of gases and solids, and combinations of liquids and solids.

The term "gas" is defined as a substance or mixture of substances in the gaseous state as distinguished from the liquid or solid state. Likewise, the term "liquid" means a substance or mixture of substances in the liquid state as distinguished from the gas or solid state.

A "gas lift system" is a type of artificial lift system used to remove completion fluids from a well or increase the performance of the well. The gas lift system generally includes a valve system for controlling the injection of compressed, or pressurized, gas from a source external to the well, such as a compressor, into the borehole. The increased pressure from the injected gas forces accumulated formation fluid up the tubing to remove the fluids as production flow or to clear the fluids and restore the free flow of gas from the formation into the well.

A "gas lift valve" (GLV) is a valve used in a gas lift system to control the flow of lift gas into the production tubing conduit. GLVs are typically located in a gas lift mandrel, which also provides communication with the lift gas supply in the tubing annulus. Operation of the GLV is determined by preset opening and closing pressures in the tubing or annulus, depending on the specific application.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_2$, $C_2H_4$, $C_2H_6$, $C_3$ isomers, $C_4$ isomers, benzene, and the like.

The terms "well" refers to holes drilled vertically, at least in part, and may also refer to holes drilled with deviated, highly deviated, and/or horizontal sections. The term also includes well equipment, surface casing, intermediate casing, and the like, typically associated with oil and gas wells.

As used herein, a "well completion" is a group of equipment and operations that may be installed and performed to produce hydrocarbons from a subsurface reservoir. The well completion may include the casing, production tubing, completion fluid, GLVs, and other well equipment used to prepare the well to produce hydrocarbons.

Overview

Techniques described herein relate to a magnetorheological dampener system that is used to protect well equipment. More particularly, techniques described herein relate to a magnetorheological dampener system that is used to resist rapid fluctuations in the value of a parameter relating to well equipment. In various embodiments, the well equipment includes, for example, a production flowline, a gas lift valve (GLV), or a plunger lift system. The value of the parameter is continuously detected using a sensor, such a mass flow sensor, a pressure sensor, or velocity sensor, for example. If the fluctuation in the value of the parameter exceeds a preset limit, or threshold, an electromagnet disposed proximate to a storage chamber and an exhaust chamber of a magnetorheological dampener may be energized using a controller. Energizing the electromagnet applies a magnetic field to a magnetorheological fluid (MRF) within the storage chamber, causing the MRF to transform from a liquid suspension of particles to a viscoelastic solid.

The viscosity of the MRF in the viscoelastic solid state determines the amount of force required to force the MRF through an orifice that fluidically couples the storage chamber to an exhaust chamber. In this manner, the magnetorheological dampener system protects well equipment by resisting, or dampening, the effects of a fluctuation in the value of the parameter. For example, the magnetorheological dampener system may protect the well equipment from being damaged by a rapid change in the mass flow, pressure, or velocity of a fluid or object within the well equipment.

Magnetorheological Dampener System

FIG. 1A is a schematic of well equipment 100 including a magnetorheological to dampener system 102 in a deactivated state. In some embodiments, the well equipment 100 includes a production flowline, and the magnetorheological dampener system 102 is used to partially obstruct the flow path of the hydrocarbon fluids within the production flowline to prevent rapid fluctuations in the mass flow and/or pressure of a slug within the production flowline from overwhelming production facilities, as described further with respect to FIGS. 3A and 3B. In other embodiments, the well equipment includes a GLV, and the magnetorheological dampener system 102 is used to prevent rapid fluctuations in the injection pressure within the GLV from causing a stem and a seat of the GLV to chatter, as described further with respect to FIGS. 4A and 4B. Moreover, in other embodiments, the well equipment includes a plunger lift system, and the magnetorheological dampener system 102 is used to reduce a mechanical impact of an artificial lift plunger as it engages with a lubricator within the plunger lift system, as described further with respect to FIGS. 5A and 5B.

As shown in FIG. 1A, the magnetorheological dampener system 102 includes a magnetorheological dampener 104, a sensor 106, and a controller 108. In various embodiments, the magnetorheological dampener 104 includes a storage chamber 110, an exhaust chamber 112, and an orifice 114 that fluidically couples the storage chamber 110 to the exhaust chamber 112. When the magnetorheological dampener system 102 is in the deactivated state, the storage chamber 110 acts as a reservoir for a magnetorheological fluid (MRF) 116. The MRF 116 is a suspension that can transition from a liquid to a viscoelastic solid, and into regions there between, with the application of a magnetic field. In various embodiments, the MRF 116 is a suspension of about 20% to about 40%, by weight, of magnetic particles in a liquid. In some embodiments, the MRF 116 is a suspension of iron particles in mineral oil, glycol, or other solvents.

An electromagnet 118 is positioned proximate to the storage chamber 110 and the exhaust chamber 112 within the magnetorheological dampener 104. As shown in FIG. 1A, the electromagnet 118 may include an electromagnetic coil disposed along one side of the storage chamber 110 and the exhaust chamber 112. In other embodiments, the electromagnet 118 may include a number of individual electromagnetic coils, e.g., three, four, five, or six, or more, placed in enclosures around the storage chamber 110 and the exhaust chamber 112, or may include two or three large electromagnetic coils that are placed around the top, sides, and bottom of the storage chamber 110 and the exhaust chamber 112. Multiple electromagnetic coils may provide resistance to failure of individual electromagnetic coils.

The magnetorheological dampener 104 also includes a plunger 120 and a spring 122 within the exhaust chamber 112. The plunger 120 and the spring 122 prevent the MRF to 116 within the storage chamber 110 from flowing through the orifice 114 to the exhaust chamber 112 when the magnetorheological dampener system 102 in the deactivated state.

The sensor 106 continuously detects the value of a parameter 124 within the well equipment 100 and sends the values to the controller 108, which is coupled to the sensor 106. The controller 108 then determines whether the magnetorheological dampener system 102 should remain in the deactivated state, or go into an activated state, as described further with respect to FIG. 1B.

Figure 1B:
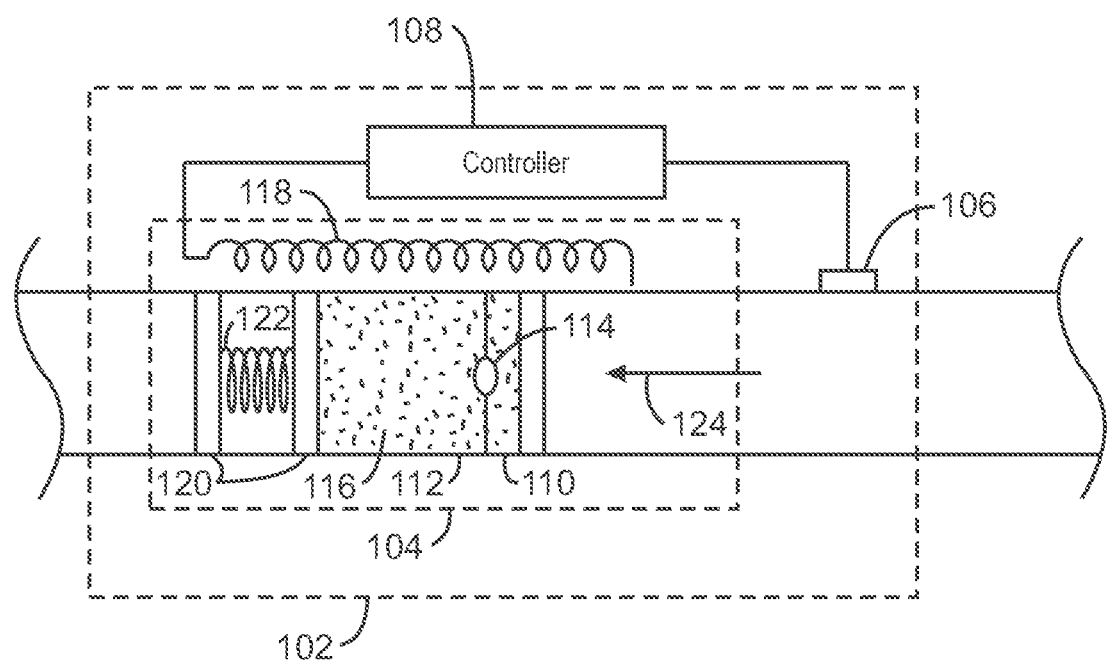
FIG. 1B is a schematic of the well equipment including the magnetorheological dampener system in an activated state.

FIG. 1B is a schematic of the well equipment 100 including the magnetorheological dampener system 102 in an activated state. Like numbered items are as described with respect to FIG. 1A. In various embodiments, when the controller 108 determines that the fluctuation in the value of the parameter 124 exceeds a preset limit, the controller 108 activates the magnetorheological dampener system 102 by energizing the electromagnet 118. When the electromagnet 118 is energized, the electromagnetic particles in the MRF 116 align, forming chains that connect to the sides of the storage chamber 110. This transitions the MRF 116 from a liquid to a viscoelastic solid.

The MRF 116 within the storage chamber 110 then flows through the orifice 114 and into the exhaust chamber 112 in response to an amount of force that is determined by the viscosity of the MRF 116 in the viscoelastic solid state. In various embodiments, the controller 108 may continuously increase or decrease the amount of energization of the electromagnet 118 to correspondingly increase or decrease the viscosity of the MRF 116. In this manner, the controller 108 may adjust the degree of dampening provided by the magnetorheological dampener system 102.

According to embodiments described herein, the magnetorheological dampener system 102 prevents the well equipment 100 from being damaged by fluctuations in the value of the parameter 124. For example, if the parameter 124 is a pressure, mass flow, or velocity of a fluid or object within the well equipment 100, the magnetorheological dampener system 102 may be used to slow the well equipment's response to rapid fluctuations in the pressure, mass flow, or velocity of the fluid or object, thus preventing damage to the components of the well equipment 100.

According to the embodiment shown in FIGS. 1A and 1B, the plunger 120 and the spring 122 within the exhaust chamber 112 cause the MRF 116 to flow back through the orifice 114 and into the storage chamber 110 when the amount of force is decreased and/or the magnetorheological dampener system 102 returns to the deactivated state. In other embodiments, gravity may be utilized to return the MRF 116 to the storage chamber 110 when the amount of force is decreased and/or the magnetorheological dampener system 102 returns to the deactivated state.

The schematics of FIGS. 1A and 1B are not intended to indicate that the magnetorheological dampener system 102 is to include all of the components shown in FIGS. 1A and 1B. Further, any number of additional components may be included within the magnetorheological dampener system 102, depending on the details of the specific implementation. For example, while only one sensor 106 is shown in FIGS. 1A and 1B, the magnetorheological dampener system 102 may include any number of additional sensors placed in any suitable locations within the well equipment 100.

Figure 2:
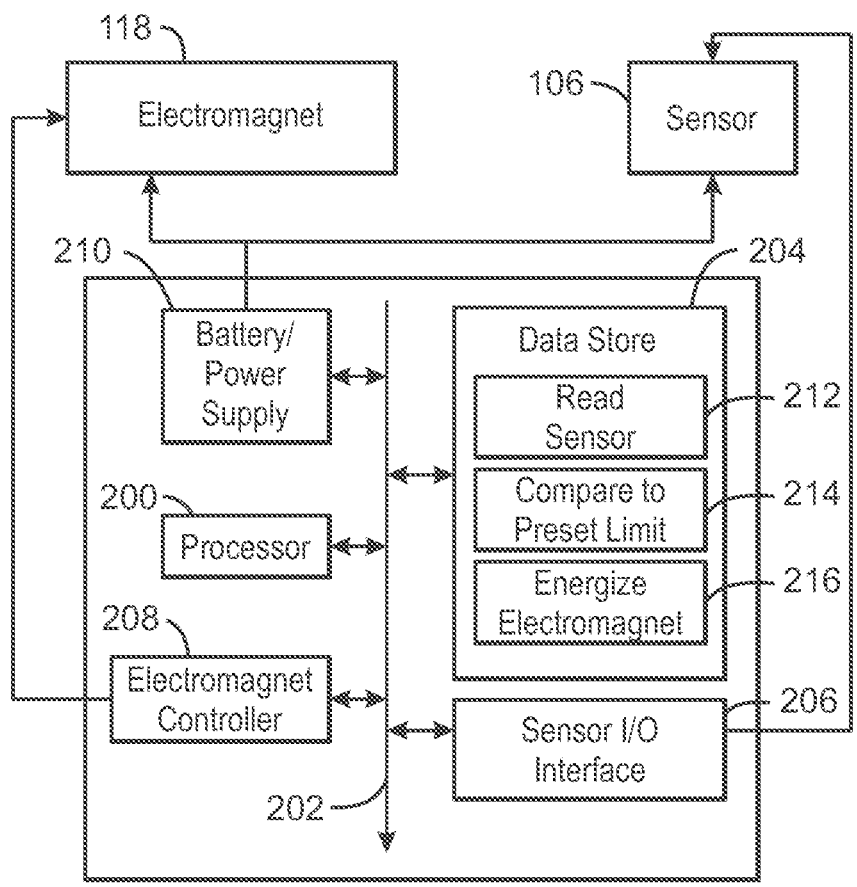
FIG. 2 is a block diagram of the magnetorheological dampener system showing an exemplary embodiment of the controller.

FIG. 2 is a block diagram of the magnetorheological dampener system 102 showing an exemplary embodiment of the controller 108. Like numbered items are as described with respect to FIGS. 1A and 1B. The controller 108 may be an individual controller dedicated to the magnetorheological dampener system 102, or the controller 108 may be a virtual system that is part of a larger system, such as a control system for a drilling rig, including, for example, a distributed control system (DCS), a portable control system, a personal computer, a laptop computer, or a mobile device, among others.

According to the embodiment shown in FIG. 2, the controller 108 has a processor 200 coupled to other functional units through a bus 202. The processor 200 may include any number of processing systems. In some embodiments, the processor 200 is a microprocessor used for a control system. In other embodiments, the processor 200 is a system-on-a-chip, a multithreaded processor, a virtual processor, a multicore processor, or any number of other processing devices, or any combinations thereof.

The processor 200 is communicatively coupled to the bus 202. In some embodiments, the bus 202 is a proprietary bus used in a system-on-a-chip. In various embodiments, the bus 202 is a dedicated high-speed serial bus, such as PCIe, or a parallel bus, such as ISA or EISA, among others. The bus 202 may include a backplane interconnect in a DCS. The bus 202 may also include lines for power and power control, among others.

The bus 202 couples the processor 200 to a data store 204. In some examples, the data store 204 includes a nonvolatile storage system for data and programs, such as a hard drive, an optical drive, a solid-state drive, a thumb drive, a non-volatile memory, and the like. The data store 204 may also include functional memory for the operation of programs and storage of data, such as random access memory, and the like. The functional memory may be nonvolatile, allowing the controller 108 to resume operations at a particular state after a power failure.

The bus 202 couples the processor 200 to a sensor input/output (I/O) interface 206.

The sensor I/O interface 206 couples the controller 108 to the sensor 106. In some embodiments, the sensor I/O interface 206 is a digital interface, such as a serial bus, for communicating with the sensor 106. In other embodiments, the sensor I/O interface 206 is an analog-to-digital converter (ADC) for converting an analog signal, such as a 4 to 20 mA current loop, from the sensor 106 to a digital signal for the processor 200. If a 4 to 20 mA current loop is used, a precision resistor may be used to convert the current to a voltage for the ADC.

The bus 202 couples the processor 200 to an electromagnet controller 208. The electromagnet controller 208 allows the controller 108 to energize the electromagnet 118. In some embodiments, the electromagnet controller 208 includes MOSFETs, or other circuitry, to allow incremental energization of the electromagnet 118, allowing for control of the dampening force. In other embodiments, the electromagnet controller 208 includes relays that, when energized, complete a power loop that includes one or more electromagnets. In this embodiment, multiple electromagnets may be energized separately to obtain different dampening forces, for example, if four electromagnets are used, a separate relay may be used to energize each of the four electromagnets to allow different levels of dampening force to be applied.

A battery/power supply 210 may be included in the controller 108 to provide power to the controller 108, the electromagnet 118, and the sensor 106. In some embodiments, power is provided to the battery/power supply 210 by a power line (not shown) from a power source, such as a control and monitoring system (not shown), located at the surface. If those embodiments, the battery may be used to power the magnetorheological dampener system 102 during periods in which power from the control and monitoring system is lost. In addition to providing power, the battery/power supply 210 may be communicatively coupled to the bus 202 to allow the processor 200 to monitor the status of the battery/power supply 210. For example, the processor 200 may monitor the charge on the battery, the current flow, and the like. This may be used to provide alarms to the control and monitoring system in case a battery is going bad.

According to embodiments described herein, the data store 204 stores instructions that, when executed by the processor 200, direct the processor 200 to perform the control functions for the magnetorheological dampener system 102. These instructions include, for example, a code module 212 that directs the processor 200 to read the value of the parameter from the sensor 106. This may be performed on a loop that reads the value of the parameter from the sensor 106 on an interval of about 1 millisecond, about 500 milliseconds, about 1 second, about 5 seconds, or about 10 seconds, depending on an expected time constant for a change in the value of the parameter.

Another code module 214 that may be included in the data store 204 determines a fluctuation in the value of the parameter and compares the fluctuation to an expected value or set point. The comparison may include calculating a preset limit around the set point outside of which the magnetorheological dampener system 102 is activated.

If the fluctuation in the value of the parameter is determined to exceed the preset limit, a code module 216 may be configured to activate the electromagnet 118 of the magnetorheological dampener system 102. In some embodiments, the activation of the electromagnet 118 is configured to be incremental depending on the fluctuation detected.

The block diagram of FIG. 2 is not intended to indicate that the controller 108 is to include all of the components shown in FIG. 2. Further, any number of additional components may be included within the controller 108, depending on the details of the specific implementation. For example, in some embodiments, the controller 108 includes a communications interface, such as a network interface controller, to provide communications with the control and monitoring system. The communications interface may interface with a power line communications device, which may provide communications with the control and monitoring system over the power line. This may be performed, for example, by imposing a high-frequency signal on the power line, or reading a high-frequency signal from the power line, for digital communications between the control and monitoring system and the controller 108.

In some embodiments, the controller 108 also includes a human machine interface that is used to interface to a local operator control. The local operator control may include an activation button used to manually activate the magnetorheological dampener system 102.

Production Flowline Slugging Embodiment

The term "slugging" refers to a condition in which a well produces large alternating volumes of liquids and gases. As the gases and liquids travel to the surface through the well's production flowline, the gases behind the liquids expand due to the gradual reduction in hydrostatic pressure within the production flowline. As a result, the gases tend to accelerate the liquids to the surface and through the production facilities very rapidly. Severe slugs can overwhelm production facilities. For example, valves and other flowline restrictions can be washed out or eroded; separators can be flooded and bypassed; tanks can overflow; and flaring can be triggered. Production choke valves can be used reduce the impact of slugging. However, such choke valves are typically not closed-loop and are prone to wear, thus requiring to additional maintenance when used frequently. Therefore, in various embodiments, the magnetorheological dampener system provided herein is used to resist a rapid increase in the mass flow and/or pressure of the hydrocarbon fluids within a production flowline, thus preventing a slug from overwhelming production facilities, as described further with respect to FIGS. 3A and 3B.

Figure 3A:
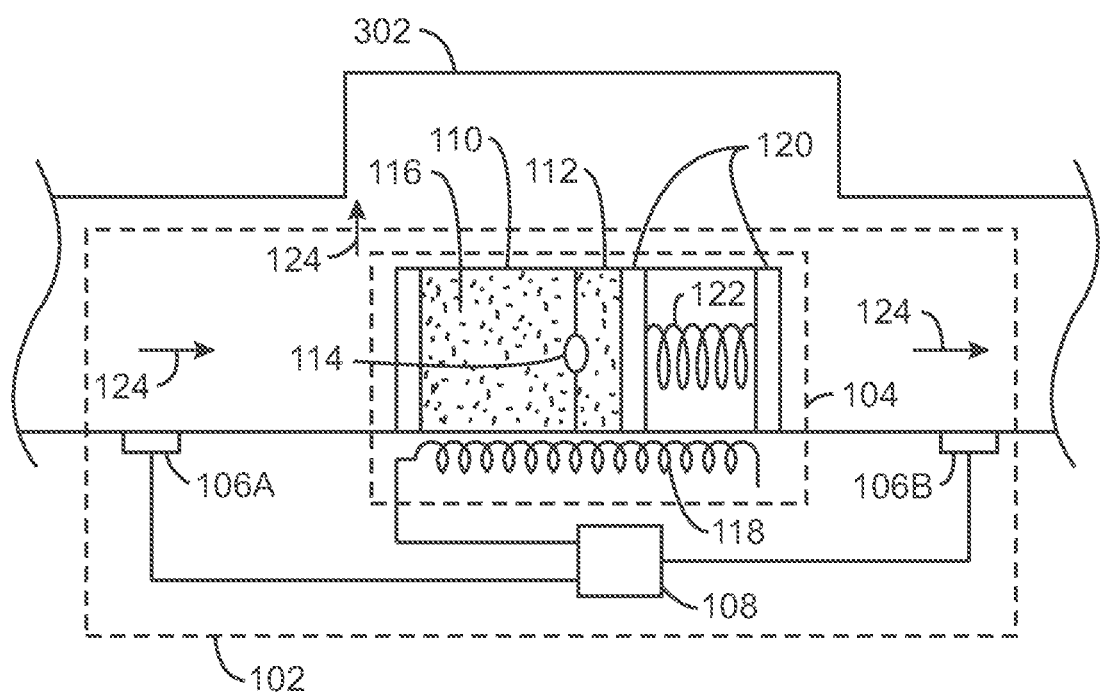
FIG. 3A is a schematic of a production flowline including the magnetorheological dampener system in the deactivated state.

FIG. 3A is a schematic of a production flowline 300 including the magnetorheological dampener system 102 in the deactivated state. Like numbered items are as described with respect to FIGS. 1A, 1B, and 2. In this embodiment, the parameter 124 is a mass flow and/or pressure of the hydrocarbon fluids within the production flowline 300. In various embodiments, a rapid increase in the mass flow and/or pressure of the hydrocarbon fluids indicates the presence of a slug within the production flowline 300. Therefore, the magnetorheological dampener system 102 is used to resist the rapid increase in the mass flow and/or pressure of the hydrocarbon fluids. This prevents the slug from damaging the production flowline 300 and downstream production facilities.

In various embodiments, the magnetorheological dampener 104 is placed in the production flowline 300 with a bypass 302. In various embodiments, hydrocarbon fluids flowing through the production flowline 300 must flow through the bypass 302 to travel around the magnetorheological dampener 104.

According to the embodiment shown in FIG. 3A, the magnetorheological dampener system 102 includes one sensor 106A located upstream of the magnetorheological dampener 104 and another sensor 106B located downstream of the magnetorheological dampener 104. In this embodiment, the sensors 106A and 106B are mass flow and/or pressure sensors that detect the mass flow and/or pressure of the hydrocarbon fluids within the production flowline 300. When the controller 108 determines that a fluctuation of the mass flow and/or pressure exceeds a preset limit, the controller 108 activates the magnetorheological dampener system 102 to dampen the effect of a slug within the production flowline, as described with respect to FIG. 3B.

Figure 3B:
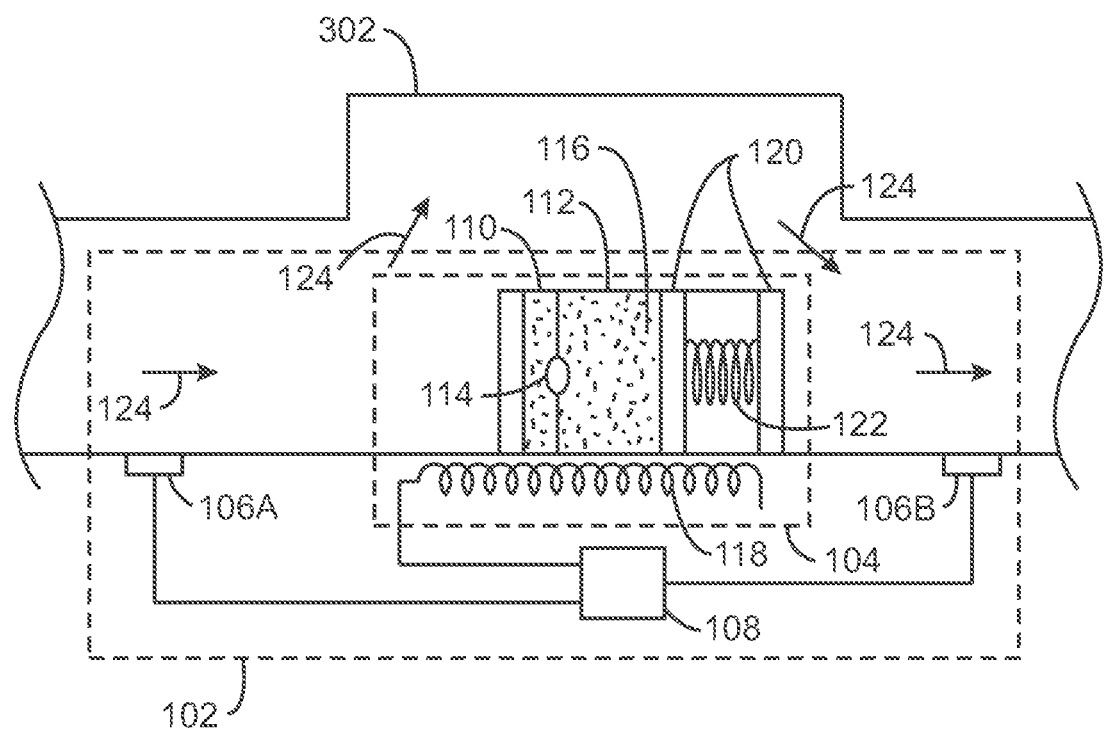
FIG. 3B is a schematic of the production flowline including the magnetorheological dampener system in the activated state.

FIG. 3B is a schematic of the production flowline 300 including the magnetorheological dampener system 102 in the activated state. Like numbered items are as described with respect to FIGS. 1A, 1B, 2, and 3A. In various embodiments, when a fluctuation in the mass flow and/or pressure of the hydrocarbon fluids exceeds a preset limit, the controller 108 activates the magnetorheological dampener system 102 by energizing the electromagnet 118. This transforms the MRF 116 to a viscoelastic solid. The MRF 116 within the storage chamber 110 then flows through the orifice 114 and into the exhaust chamber 112 to in response to an amount of force that is determined by the viscosity of the MRF 116 in the viscoelastic solid state. The effect of the mass flow and/or pressure of the slug within the production flowline 300 is then dampened due to the force exerted to move the magnetorheological dampener 104 out of the flow path so that the slug can freely flow through the bypass 302 in the production flowline 300.

When the amount of force exerted by the slug on the magnetorheological dampener system 102 is decreased, for example, as a result of the mass flow and/or pressure of the hydrocarbon fluids decreasing, the plunger 120 and the spring 122 within the exhaust chamber 112 cause the MRF 116 to flow back through the orifice 114 and into the storage chamber 110. This resets the magnetorheological dampener system 102 until the controller 108 detects additional slugs in the production flowline 300.

In some embodiments, if severe slugs are expected, two or more pipes may be run in parallel with one or more switching valves connecting the pipes to the production flowline 300. Each pipe may include a magnetorheological dampener system 102. The fluid flow within the production flowline 300 may then be alternated between the two pipes to allow the magnetorheological dampener system 102 within one pipe to fully reset while the magnetorheological dampener system 102 within the other pipe is in use.

The schematics of FIGS. 3A and 3B are not intended to indicate that the production flowline 300 is to include all of the components shown in FIGS. 3A and 3B. Further, any number of additional components may be included within the production flowline 300, depending on the details of the specific implementation.

Gas Lift Valve (GLV) Chattering Embodiment

A typical gas lift valve (GLV) includes a nitrogen-charged dome, a spring-loaded bellows, a stem and seat, and a reverse-flow check valve. The nitrogen charge pressure within the dome is set based on the installed depth of the GLV and the expected gas injection pressure to be applied. A compressed gas travels down the annulus of the well and enters the GLV. The compressed gas applies pressure, referred to as "injection pressure," to the bellows and the dome. In addition, hydrocarbon fluids within the interior of the production tubing apply pressure, referred to as "production pressure," to a tip of the GLV's stem. When the sum of the injection pressure and the production pressure, i.e., the "total pressure," exceeds the nitrogen charge pressure within the dome, the spring-loaded bellows compresses, disengaging the tip of the stem from the seat. This allows the compressed gas to flow through the GLV and into the interior of the production tubing.

When the total pressure is rapidly fluctuating, the stem can be lifted off of the seat to and then reseated nearly immediately thereafter. This seating/unseating process is referred to as "chattering." Chattering can damage the stem and the seat and, thus, deteriorate the GLV's performance. According to current techniques, there is no effective downhole means of actively resisting GLV chattering. Therefore, in various embodiments, the magnetorheological dampener system provided herein is used to resist fluctuations in the injection pressure within a GLV, thus preventing chattering of the stem and seat of the GLV, as described further with respect to FIGS. 4A and 4B.

Figure 4A:
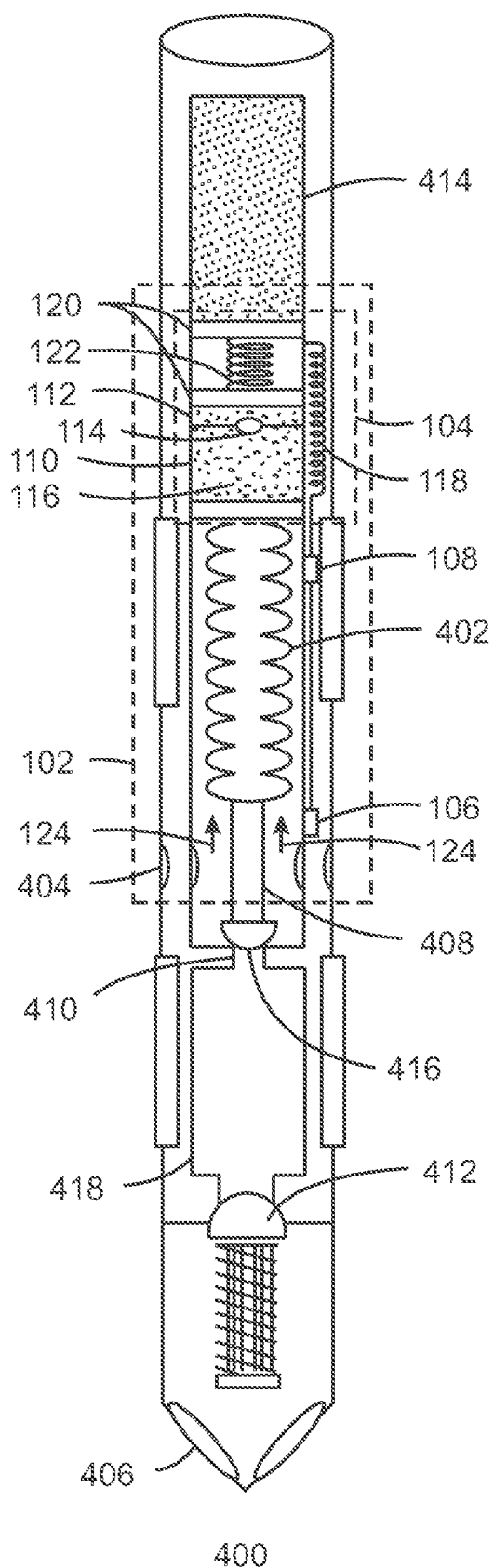
FIG. 4A is a schematic of a gas lift valve (GLV) including the magnetorheological dampener system in the deactivated state.
Figure 4B:
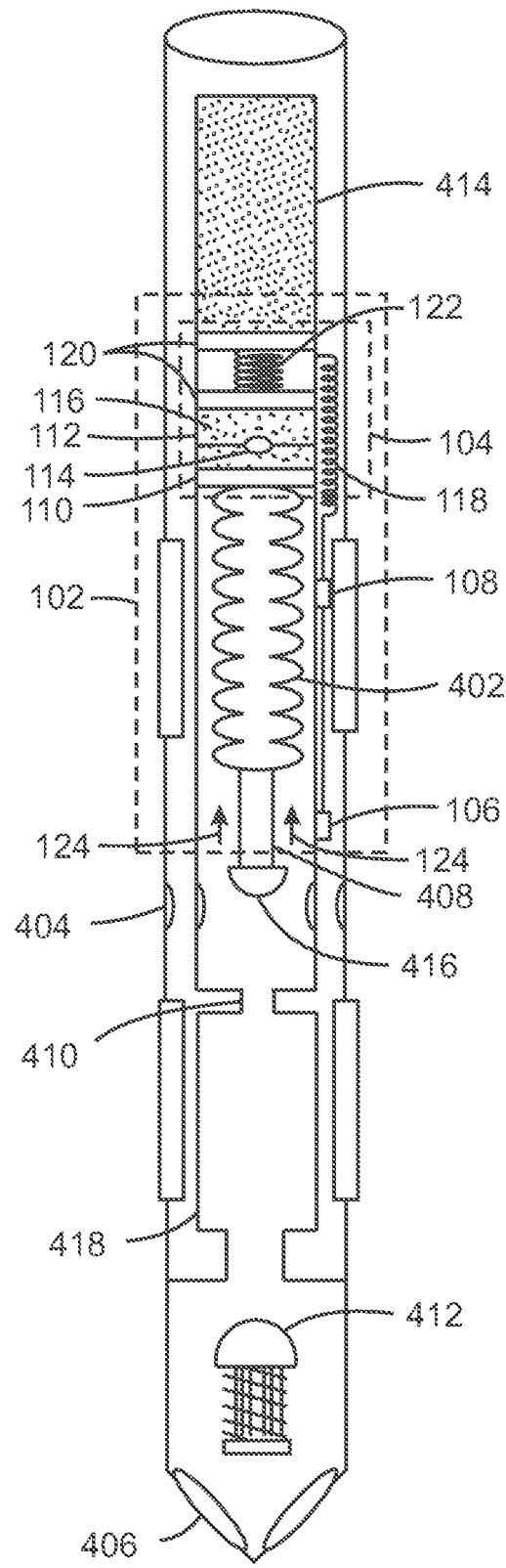
FIG. 4B is a schematic of the GLV including the magnetorheological dampener to system in the activated state.

FIG. 4A is a schematic of a GLV 400 including the magnetorheological dampener system 102 in the deactivated state. Like numbered items are as described with respect to FIGS. 1A, 1B, and 2. In various embodiments, the GLV 400 is implemented with a gas lift system, and is used to remove completion fluids from a well or to increase the performance of the well. According to the embodiment shown in FIG. 4A, the GLV 400 is in the closed position. The GLV 400 includes a spring-loaded bellows 402, which provides the operational force that determines the pressure at which the GLV 400 will open and close. The GLV 400 also includes an orifice 404 that allows compressed gas to flow from the annulus of the well into the GLV 400, as well as an internal nozzle 406 that allows the compressed gas to flow from the GLV 400 to the interior of the production tubing of the well when the GLV 400 is in the open position, as shown in FIG. 4B.

The GLV 400 includes a stem 408 and a seat 410 that prevent the compressed gas within the annulus from flowing through the GLV 400 to the interior of the production tubing when the GLV 400 is in the closed position. In addition, the GLV 400 includes a reverse-flow check valve 412 that prevents hydrocarbon fluids within the interior of the production tubing from flowing through the GLV 400 to the annulus when the GLV 400 is in the closed position.

The GLV 400 also includes a nitrogen-charged dome 414. According to the embodiment shown in FIGS. 4A and 4B, the magnetorheological dampener 104 is positioned between the bellows 402 and the dome 414 of the GLV 400. When the nitrogen charge pressure within the dome 414 is higher than the total pressure applied to the dome 414, which is the sum of the injection pressure that the compressed gas applies to the bellows 402 and the production pressure that the hydrocarbon fluids within the interior of the production tubing apply to a tip 416 of the stem 408, the tip 416 of the stem 408 rests against the seat 410. This prevents the compressed gas within the annulus from flowing through the GLV 400 to the interior of the production tubing. Moreover, because the GLV 400 is in the closed position, minimal pressure is applied downward on the reverse-flow check valve 412. Therefore, the reverse-flow check valve 412 remains closed, preventing hydrocarbon fluids within the interior of the production to tubing from flowing through the GLV 400 to the annulus.

According to the embodiment shown in FIG. 4A, the magnetorheological dampener system 102 includes one sensor 106 located near the bellows 402 of the GLV 400. In this embodiment, the sensor 106 is a pressure sensor that determines the injection pressure that the compressed gas applies to the bellows 402. When the controller 108 determines that a fluctuation of the injection pressure exceeds a preset limit, such as, for example, when the injection pressure is rapidly fluctuating above and below the amount of pressure needed to open the GLV 400, the controller 108 activates the magnetorheological dampener system 102 to dampen the effect of pressure swings within the GLV 400, as described with respect to FIG. 4B.

FIG. 4B is a schematic of the GLV 400 including the magnetorheological dampener system 102 in the activated state. Like numbered items are as described with respect to FIGS. 1A, 1B, 2, and 4A. According to the embodiment shown in FIG. 4B, the GLV 400 is in the open position. Specifically, when the total pressure applied to the dome 414 is higher than the nitrogen charge pressure within the dome 414, the spring-loaded bellows 402 compresses, disengaging the tip 416 of the stem 408 from the seat 410. This allows the compressed gas to flow into an internal chamber 418 of the GLV 400. Moreover, the downward application of the injection pressure to the reverse-flow check valve 412 also causes the reverse-flow check valve 412 to open. This allows the compressed gas within the annulus to flow through the GLV 400 to the interior of the production tubing.

According to embodiments described herein, when a fluctuation in the injection pressure exceeds a preset limit, the controller 108 activates the magnetorheological dampener system 102 by energizing the electromagnet 118. This transforms the MRF 116 to a viscoelastic solid. The MRF 116 within the storage chamber 110 then flows through the orifice 114 and into the exhaust chamber 112 in response to an amount of force that is determined by the viscosity of the MRF 116 in the viscoelastic solid state. As a result, the effect of the pressure swing within the GLV 400 is dampened due to the force exerted to move the magnetorheological dampener 104 enough to open the GLV 400. This, in turn, prevents the stem 408 and the seat 410 of the GLV 400 from chattering.

When the amount of force exerted by the compressed gas on the bellows 402 is decreased, i.e., as a result of the injection pressure decreasing, the plunger 120 and the spring 122 within the exhaust chamber 112 cause the MRF 116 to flow back through the orifice 114 and into the storage chamber 110. This resets the magnetorheological dampener system 102 until the controller 108 detects additional pressure swings within the GLV 400.

The schematics of FIGS. 4A and 4B are not intended to indicate that the GLV 400 is to include all of the components shown in FIGS. 4A and 4B. Further, any number of additional components may be included within the GLV 400, depending on the details of the specific implementation.

Plunger Lift System Safety Embodiment

A plunger lift system includes an artificial lift plunger that is used to lift liquids out of oil and gas wells. A plunger stop and bumper spring are placed in the production tubing, typically near the end of the string. An artificial lift plunger, which is a cylindrical metal tool, is dropped into the tubing and falls to the plunger stop and bumper spring. The well's casing and tubing are then shut in to build reservoir pressure. This allows a fluid level to rise around and above the artificial lift plunger. The artificial lift plunger is then returned to the surface by opening the tubing valve, instantly reducing the pressure. The annular-to-tubing pressure differential drives the artificial lift plunger and the accumulated liquids to the surface. This reduces the backpressure on the reservoir, allowing for the efficient production of hydrocarbon fluids from the well.

The artificial lift plunger is caught at the surface using a lubricator, which consists of an extension to the wellhead with an energy-absorbing spring and a catch. The artificial lift plunger is then released to repeat its cycling once the production of hydrocarbon fluids from the well slows down or ceases due to the accumulation of liquids within the production tubing.

Sometimes an artificial lift plunger trips to the surface without a liquid load to cushion it. This is referred to as a "dry trip." In a dry tip scenario, an artificial lift plunger can easily accelerate to a velocity exceeding 1,000 feet per minute. An artificial lift plunger typically weighs several pounds, so considerable kinetic energy can be conveyed to the lubricator in a dry trip scenario. Dry trips have been known to damage lubricators, sometimes tearing them off the wellhead. This results in a free-flow situation, referred to as a "blowout," which is a major safety and environmental hazard. According to current techniques, there is no way to effectively prevent lubricator damage caused by dry trips. Therefore, in various embodiments, the magnetorheological dampener system provided herein is used to resist a rapid increase in the velocity of an artificial lift plunger as it approaches a lubricator, thus reducing the mechanical impact of the artificial lift plunger as it engages with the lubricator, as described further with respect to FIGS. 5A and 5B.

Figure 5A:
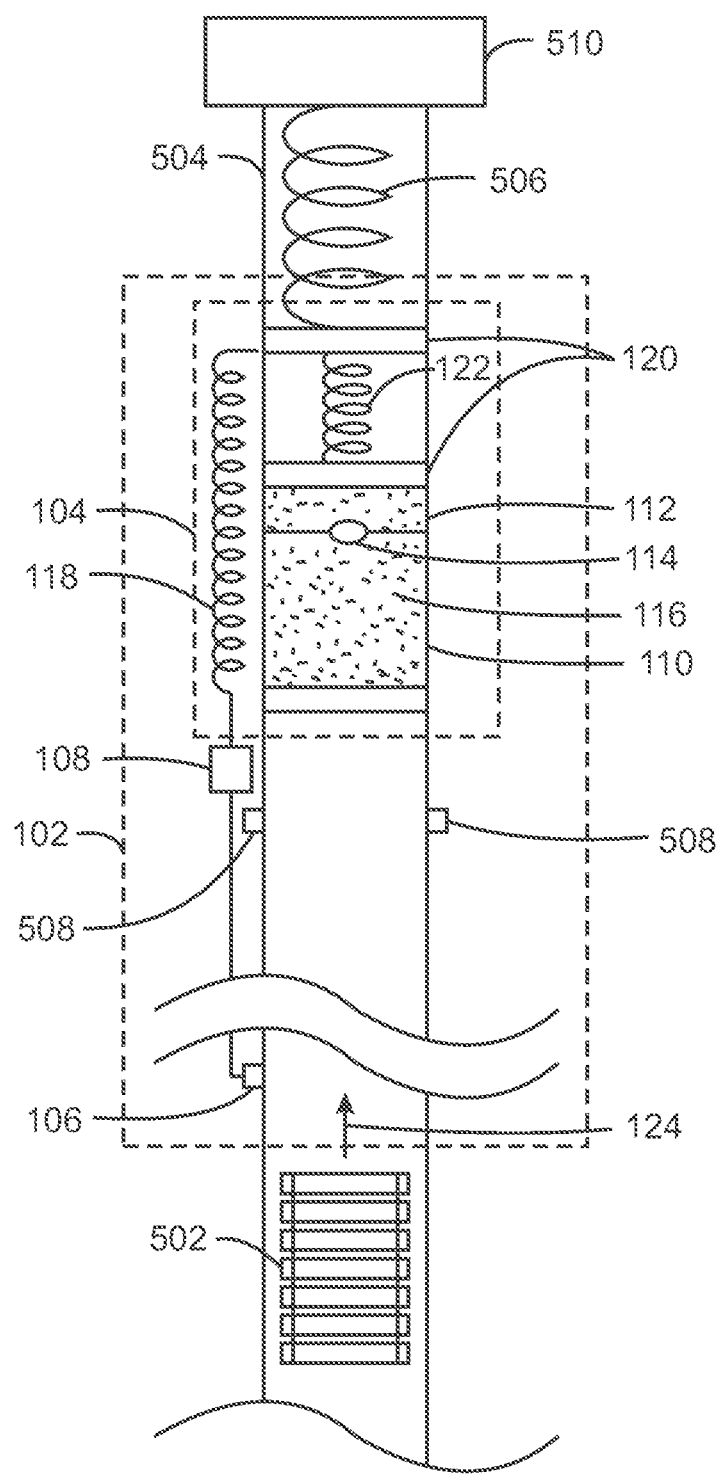
FIG. 5A is a schematic of an plunger lift system including the magnetorheological dampener system in the deactivated state.

FIG. 5A is a schematic of a plunger lift system 500 including the magnetorheological dampener system 102 in the deactivated state. Like numbered items are as described with respect to FIGS. 1A, 1B, and 2. In this embodiment, the parameter 124 is a velocity of an artificial lift plunger 502 as it approaches a lubricator 504 within the plunger lift system 500, and the magnetorheological dampener system 102 is used to resist a rapid increase in the velocity of the artificial lift plunger as it approaches the lubricator 504.

In various embodiments, the lubricator 504 includes a spring 506, a catch 508, and a cap 510. In normal operation, the spring 506 absorbs the mechanical impact of the artificial lift plunger 502 as it engages with the lubricator 504. The catch 508 maintains the artificial lift plunger at the surface when it is not in use to allow the hydrocarbon fluids to flow more freely from the well. In addition, the cap 510 maintains the lubricator 504 and the artificial lift plunger 502 within the plunger lift system 500.

As shown in FIG. 5A, the magnetorheological dampener 104 is placed upstream of the spring 506. In this embodiment, the sensor 106 is a velocity sensor that detects the velocity of the artificial lift plunger 502 as it approaches the lubricator 504. When the controller 108 determines that a fluctuation of the velocity exceeds a preset limit, such as, for example, when the artificial lift plunger 502 is rapidly accelerating in a dry tip scenario, the controller 108 activates the magnetorheological dampener system 102 to dampen the mechanical impact of the artificial lift plunger 502 as it engages with the lubricator 504, as described with respect to FIG. 5B.

Figure 5B:
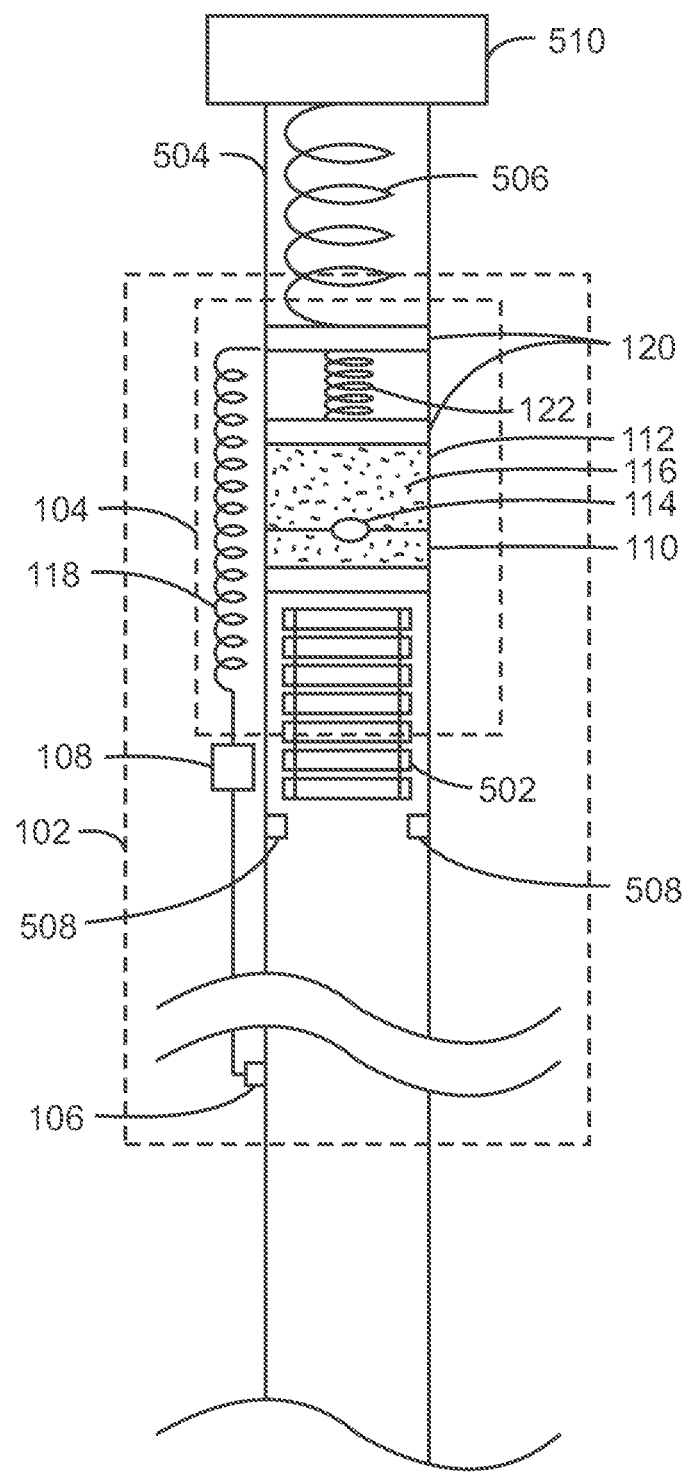
FIG. 5B is a schematic of the plunger lift system including the magnetorheological dampener system in the activated state.

FIG. 5B is a schematic of the plunger lift system 500 including the magnetorheological dampener system 102 in the activated state. Like numbered items are as described with respect to FIGS. 1A, 1B, 2, and 5A. In various embodiments, when a fluctuation in the velocity of the artificial lift plunger 502 exceeds a preset limit, the controller 108 activates the magnetorheological dampener system 102 by energizing the electromagnet 118. This transforms the MRF 116 to a viscoelastic solid. The MRF 116 within the storage chamber 110 then flows through the orifice 114 and into the exhaust chamber 112 in response to an amount of force that is determined by the viscosity of the MRF 116 in the viscoelastic solid state. The mechanical impact of the artificial lift plunger 502 as it engages with the lubricator 504 is then dampened due to the force exerted to move the magnetorheological dampener 104 out of the path of the artificial lift plunger 502. Moreover, the compression of the magnetorheological dampener 104 allows the catch 508 to be activated, thus securing the artificial lift plunger 502 in place within the lubricator 504.

Once the artificial lift plunger 502 leaves the wellhead, it no longer exerts force on the magnetorheological dampener 104. Therefore, the plunger 120 and the spring 122 within the exhaust chamber 112 cause the MRF 116 to flow back through the orifice 114 and into the storage chamber 110. Moreover, in some embodiments, gravity may be utilized to return the to MRF 116 to the storage chamber 110.

The schematics of FIGS. 5A and 5B are not intended to indicate that the plunger lift system 500 is to include all of the components shown in FIGS. 5A and 5B. For example, in some embodiments, the lubricator 504 does not include the catch 508. In those embodiments, the artificial lift plunger 502 floats above the fluid flowing beneath it and falls back to the bottom when the fluid is not exerting enough force to resist gravity. Further, any number of additional components may be included within the plunger lift system 500, depending on the details of the specific implementation.

Further, it is to be understood that the embodiments described with respect to FIGS. 3A, 3B, 4A, 4B, 5A, and 5B are merely exemplary embodiments showing useful applications of the magnetorheological dampener system described herein. The magnetorheological dampener system may also be used for any number of other applications, such as, for example, to protect any suitable well equipment located within a well completion or production facilities. As an example, in some embodiments, the magnetorheological dampener system described herein is used to protect a pig catcher from the mechanical impact of a pig as it engages with the pig catcher.

Figure 6:
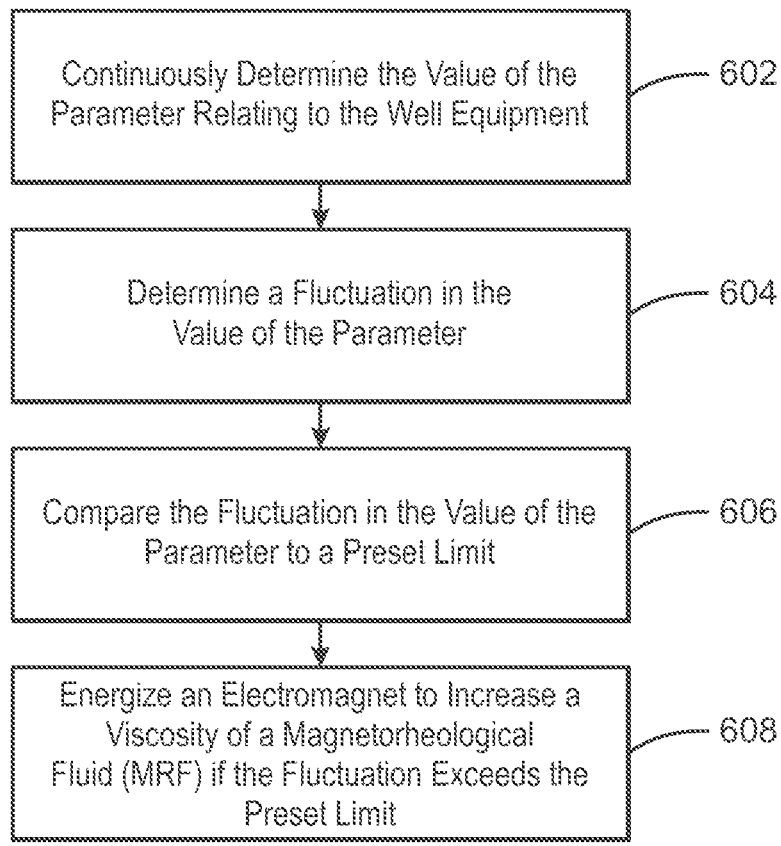
FIG. 6 is a process flow diagram of a method for resisting a fluctuation in a value of a parameter relating to well equipment using a magnetorheological dampener system.

Method for Resisting a Fluctuation in a Value of a Parameter relating to Well Equipment using a Magnetorheological Dampener System FIG. 6 is a process flow diagram of a method 600 for resisting a fluctuation in a value of a parameter relating to well equipment using a magnetorheological dampener system. According to embodiments described herein, the method 600 is implemented by a magnetorheological dampener system, such as the magnetorheological dampener system 102 described with respect to FIGS. 1A, 1B, and 2. In some embodiments, the magnetorheological dampener system is implemented within a production flowline, as described with respect to FIGS. 3A and 3B. In other embodiments, the magnetorheological dampener system is implemented within a gas lift valve (GLV), as described with respect to FIGS. 4A and 4B. In other embodiments, the magnetorheological dampener system is implemented within a plunger lift system, as described with respect to FIGS. 5A and 5B. Moreover, in other embodiments, the magnetorheological dampener system may be implemented within any other suitable well equipment, such as a pig catcher, for example.

The method 600 begins at block 602, at which the value of a parameter relating to the well equipment is continuously determined. This may include continuously detecting the value of the parameter using a sensor, and reading the value of the parameter using a controller that is communicably coupled to the sensor.

At block 604, a fluctuation in the value of the parameter is determined. At block 606, the fluctuation in the value of the parameter is compared to a preset limit. At block 608, an electromagnet is energized to increase a viscosity of a magnetorheological fluid (MRF) if the fluctuation exceeds the preset limit. In various embodiments, blocks 604, 606, and 608 are performed by the controller. In some embodiments, the controller continuously increases or decreases the amount of energization of the electromagnet based on the fluctuation in the value of the parameter.

According to embodiments described herein, the fluctuation in the value of the parameter may be resisted by allowing the MRF to flow from a storage chamber to an exhaust chamber in response to an amount of force that is determined by the viscosity of the MRF. In some embodiments, the MRF may then flow from the exhaust chamber back to the storage chamber when the amount of force is decreased. In addition, the electromagnet may be de-energized to decrease the viscosity of the MRF when the fluctuation no longer exceeds the preset limit.

The process flow diagram of FIG. 6 is not intended to indicate that the steps of the method 600 are to be executed in any particular order, or that all of the steps of the method 600 are to be included in every case. Further, any number of additional steps not shown in FIG. 6 may be included within the method 600, depending on the details of the specific implementation.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A magnetorheological dampener disposed within well equipment, comprising:
   a storage chamber containing a magnetorheological fluid (MRF);
   an exhaust chamber, comprising a plunger and a spring;
   an orifice that fluidically couples the storage chamber to the exhaust chamber; and
   an electromagnet disposed proximate to the storage chamber and the exhaust chamber;
   wherein the electromagnet is configured to increase a viscosity of the MRF to resist a fluctuation in a value of a parameter within the well equipment, and wherein the MRF flows through the orifice and into the exhaust chamber in response to an amount of force that is determined by the viscosity of the MRF; and
   wherein the plunger and the spring within the exhaust chamber cause the MRF to flow back through the orifice and into the storage chamber when the amount of force is decreased.

2. The magnetorheological dampener of claim 1, wherein the electromagnet increases the viscosity of the MRF in response to being energized by a controller.

3. The magnetorheological dampener of claim 1, wherein the electromagnet is configured to decrease the viscosity of the MRF when the fluctuation in the value of the parameter is not detected.

4. The magnetorheological dampener of claim 3, wherein the electromagnet decreases the viscosity of the MRF in response to being de-energized by a controller.

5. The magnetorheological dampener of claim 1, wherein the well equipment comprises a gas lift valve (GLV); the magnetorheological dampener is disposed between a bellows and a dome of the GLV; and the parameter comprise an injection pressure within the GLV.

6. The magnetorheological dampener of claim 1, wherein the well equipment comprises a plunger lift system; the magnetorheological dampener is disposed between a lubricator and a path of an artificial lift plunger within the plunger lift system; and the parameter comprise a velocity of the artificial lift plunger as it travels towards the lubricator.

7. The magnetorheological dampener of claim 1, wherein the well equipment comprises a production flowline; the magnetorheological dampener is disposed in a flow path of hydrocarbon fluids within the production flowline; and the parameter comprise at least one of a mass flow or a pressure of the hydrocarbon fluids within the production flowline.

8. A method for resisting a fluctuation in a value of a parameter relating to well equipment using a magnetorheological dampener system, comprising:
continuously determining the value of the parameter relating to the well equipment;
determining a fluctuation in the value of the parameter;
comparing the fluctuation in the value of the parameter to a preset limit;
energizing an electromagnet to increase a viscosity of a magnetorheological fluid (MRF) when the fluctuation in the value of the parameter exceeds the preset limit;
resisting the fluctuation in the value of the parameter by allowing the MRF to flow from a storage chamber to an exhaust chamber via an orifice in response to an amount of force that is determined by the viscosity of the MRF; and
allowing the MRF to flow from the exhaust chamber back to the storage chamber via the orifice when the amount of force is decreased, wherein a plunger and a spring within the exhaust chamber cause the MRF to flow back through the orifice and into the storage chamber.

9. The method of claim 8, comprising de-energizing the electromagnet to decrease the viscosity of the MRF when the fluctuation no longer exceeds the preset limit.

10. The method of claim 8, wherein the well equipment comprises a gas lift valve (GLV); and wherein the parameter comprises an injection pressure within the GLV.

11. The method of claim 8, wherein the well equipment comprises a plunger lift system; and wherein the parameter comprises a velocity of an artificial lift plunger within the plunger lift system.

12. The method of claim 8, wherein the well equipment comprises a production flowline; and wherein the parameter comprises at least one of a mass flow or a pressure of hydrocarbon fluids within the production flowline.

13. The method of claim 8, wherein continuously determining the value of the parameter relating to the well equipment comprises:
continuously detecting the value of the parameter using a sensor; and
reading the value of the parameter using a controller that is communicably coupled to the sensor.

14. The method of claim 8, wherein energizing the electromagnet to increase the viscosity of the MRF comprises continuously increasing or decreasing an amount of energization of the electromagnet based on the fluctuation in the value of the parameter.

15. A magnetorheological dampener system, comprising:
a sensor configured to detect a value of a parameter within well equipment;
a magnetorheological dampener, comprising:
a storage chamber containing a magnetorheological fluid (MRF);
an exhaust chamber, comprising a plunger and a spring;
an orifice that fluidically couples the storage chamber to the exhaust chamber; and
an electromagnet disposed proximate to the storage chamber and the exhaust chamber; and
a controller, comprising:
a processor configured to implement instructions from a data store; and
the data store, comprising instructions to direct the processor to:
continuously read the value of the parameter;
determine a fluctuation in the value of the parameter;
compare the fluctuation in the value of the parameter to a preset limit; and
energize the electromagnet to increase a viscosity of the MRF when the fluctuation in the value of the parameter exceeds the preset limit;
wherein the MRF flows through the orifice and into the exhaust chamber in response to an amount of force that is determined by the viscosity of the MRF; and
wherein the plunger and the spring within the exhaust chamber cause the MRF to flow back through the orifice and into the storage chamber when the amount of force is decreased.

16. The magnetorheological dampener system of claim 15, wherein the data store comprises instruction to direct the processor to de-energize the electromagnet to decrease the viscosity of the MRF when the fluctuation no longer exceeds the preset limit.

17. The magnetorheological dampener system of claim 15, wherein the well equipment comprises a gas lift valve (GLV); the magnetorheological dampener is disposed between a bellows and a dome of the GLV; the sensor comprises a pressure sensor; and the parameter comprise an injection pressure within the GLV.

18. The magnetorheological dampener system of claim 17, wherein the magnetorheological dampener prevents fluctuations in the injection pressure from causing a stem and a seat of the GLV to chatter.

19. The magnetorheological dampener system of claim 15, wherein the well equipment comprises a plunger lift system; the magnetorheological dampener is disposed between a lubricator and a path of an artificial lift plunger within the plunger lift system; the sensor comprises a velocity sensor; and the parameter comprise a velocity of the artificial lift plunger as it travels towards the lubricator.

20. The magnetorheological dampener system of claim 19, wherein the magnetorheological dampener reduces a mechanical impact of the artificial lift plunger as it engages with the lubricator.

21. The magnetorheological dampener system of claim 15, wherein the well equipment comprises a production flowline; the magnetorheological dampener is disposed in a flow path of hydrocarbon fluids within the production flowline; the sensor comprises at least one of a mass flow sensor or a pressure sensor; and the parameter comprise at least one of a mass flow or a pressure of the hydrocarbon fluids within the production flowline.

22. The magnetorheological dampener system of claim 21, wherein the magnetorheological dampener partially obstructs the flow path of the hydrocarbon fluids within the production flowline to prevent fluctuations in the mass flow or the pressure of the hydrocarbon fluids from overwhelming production facilities.

23. The magnetorheological dampener system of claim 21, comprising two pipes connected to the production flowline via a switching valve, wherein each of the two pipes comprises a magnetorheological dampener system, and wherein the flow path of the hydrocarbon fluids within the production flowline is alternated between the two pipes.

24. The magnetorheological dampener system of claim 15, wherein the well equipment comprises a pig catcher; the magnetorheological dampener is disposed between the pig catcher and a path of a pig; the sensor comprises a velocity sensor; and the parameter comprise a velocity of the pig as it travels towards the pig catcher.

25. The magnetorheological dampener system of claim 15, wherein the data store comprises instructions to direct the processor to continuously increase or decrease an amount of energization of the electromagnet based on the fluctuation in the value of the parameter.

* * * * *